(12) United States Patent
Anglin et al.

(10) Patent No.: US 10,883,540 B1
(45) Date of Patent: Jan. 5, 2021

(54) STRAIN MEASURING DEVICE FOR BEARING COMPARTMENT

(71) Applicant: United Technologies Corporation, Farmington, CT (US)

(72) Inventors: Christopher T. Anglin, Manchester, CT (US); Heriberto Rodriguez, Moca, PR (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 16/686,459

(22) Filed: Nov. 18, 2019

(51) Int. Cl.
*F16C 27/06* (2006.01)
*F16C 41/00* (2006.01)
*F01D 25/16* (2006.01)

(52) U.S. Cl.
CPC .......... *F16C 27/066* (2013.01); *F01D 25/162* (2013.01); *F16C 41/00* (2013.01); *F16C 2233/00* (2013.01)

(58) Field of Classification Search
CPC ........ F16C 27/06; F16C 27/066; F16C 35/07; F16C 35/077; F16C 41/00; F16C 2233/00; F01D 25/16; F01D 25/162; F01D 25/164
See application file for complete search history.

(56) References Cited

U.S. PATENT DOCUMENTS

| | | | |
|---|---|---|---|
| 4,145,919 A | 3/1979 | Bauer et al. | |
| 5,033,875 A * | 7/1991 | Moulinet | F16C 27/066 384/536 |
| 5,853,260 A * | 12/1998 | Curbillon | F16C 27/066 403/291 |
| 6,105,439 A | 8/2000 | Roger | |
| 8,267,592 B2 * | 9/2012 | Godleski | F01D 25/164 384/558 |
| 8,740,467 B2 * | 6/2014 | Ravenna | F16C 35/077 384/544 |
| 9,068,515 B2 | 6/2015 | Duong et al. | |

FOREIGN PATENT DOCUMENTS

KR   1020090118612 A   11/2009
RU      2601513 C1     11/2016

* cited by examiner

*Primary Examiner* — James Pilkington
(74) *Attorney, Agent, or Firm* — Kinney & Lange, P.A.

(57) ABSTRACT

A thrust-sensing assembly for a bearing compartment of a gas turbine engine includes a spacer and a retaining ring. The spacer includes an outer frusto-conical portion and an inner ring. The outer frusto-conical portion includes an axial row of a plurality of slots. Each slot of the plurality of slots includes a first rounded end, a second rounded end, a first side-face, and a second side face that faces the first side-face. The retaining ring includes a plurality of axial extensions with distal ends that are in contact with the outer frusto-conical portion of the spacer.

20 Claims, 4 Drawing Sheets

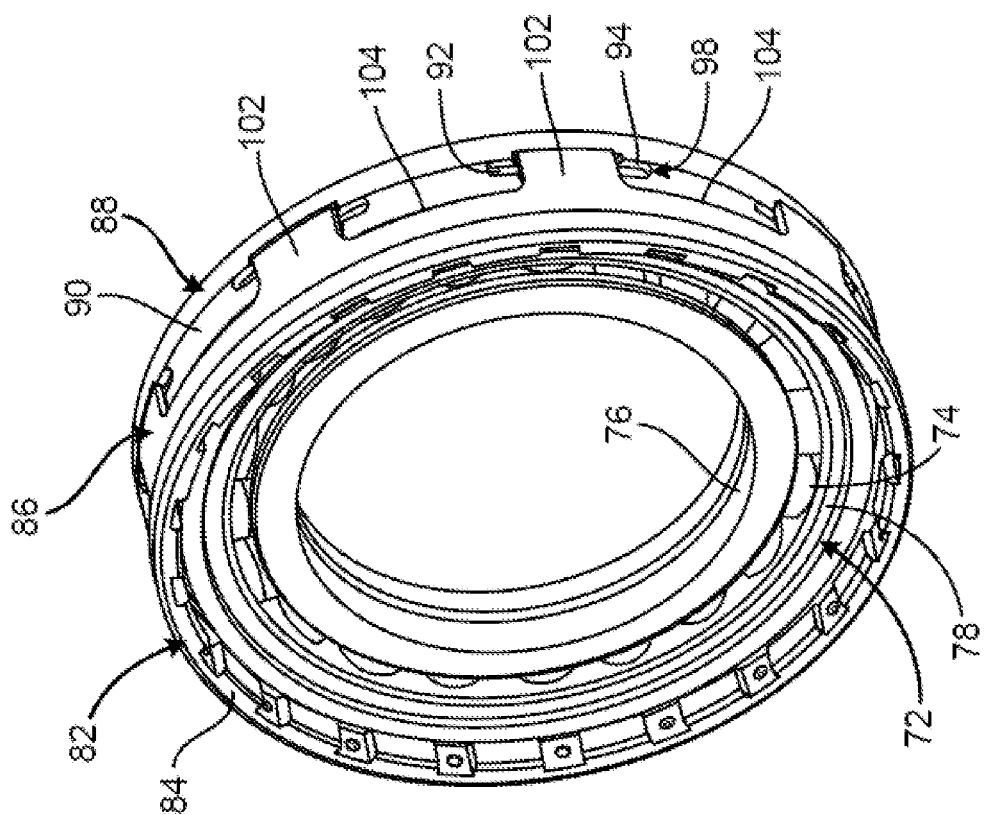
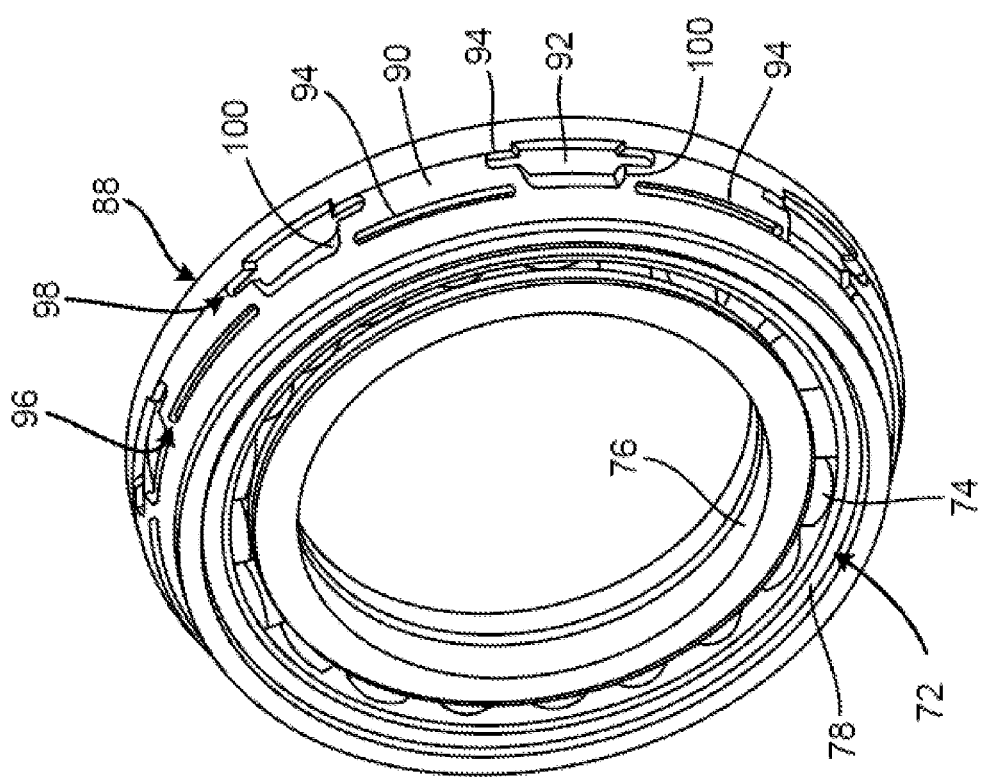

US 10,883,540 B1

STRAIN MEASURING DEVICE FOR BEARING COMPARTMENT

BACKGROUND

The present disclosure relates to a bearing assembly of a gas turbine engine and more particularly, to a strain measuring device for a bearing assembly of a gas turbine engine.

In bearing compartments of gas turbine engines, axial thrust is measured in order to monitor the thrust balance on the bearings. Understanding the thrust balance of the bearings is important to ensure bearings are not overloaded or null loaded. In the case of a bearing connected to centering rods or a centering spring, measurement can involve strain gauges to determine thrust load. Conventionally, however, ball bearings that are hard-mounted (without a centering spring) in the bearing compartment do not have a convenient place to measure axial strain.

SUMMARY

A thrust-sensing assembly for a bearing compartment of a gas turbine engine includes a spacer and a retaining ring. The spacer includes an outer frusto-conical portion and an inner ring. The outer frusto-conical portion includes an axial row of a plurality of slots. Each slot of the plurality of slots includes a first rounded end, a second rounded end, a first side-face, and a second side face that faces the first side-face. The retaining ring includes a plurality of axial extensions with distal ends that are in contact with the outer frusto-conical portion of the spacer.

An assembly for a bearing compartment of a gas turbine engine includes a bearing support, a thrust-sensing assembly, and a bearing assembly. The bearing support is connected to a frame of the gas turbine engine. The thrust-sensing assembly held in position by the bearing support and includes a spacer and a retaining ring. The spacer includes an outer frusto-conical portion with an axial row of a plurality of slots and an inner ring connected to the outer frusto-conical portion. The retaining ring includes a plurality of axial extensions that are in contact with the outer frusto-conical portion of the spacer. The bearing assembly is disposed radially inward and in contact with the thrust sensing assembly.

The present summary is provided only by way of example, and not limitation. Other aspects of the present disclosure will be appreciated in view of the entirety of the present disclosure, including the entire text, claims, and accompanying figures.

BRIEF DESCRIPTION OF THE DRAWINGS

FIG. 3A is an isolation view of the spacer of the thrust-sensing assembly.

FIG. 3B is an isolation view of the thrust-sensing assembly with a spacer, a retaining ring, and a nut.

Figure 1:
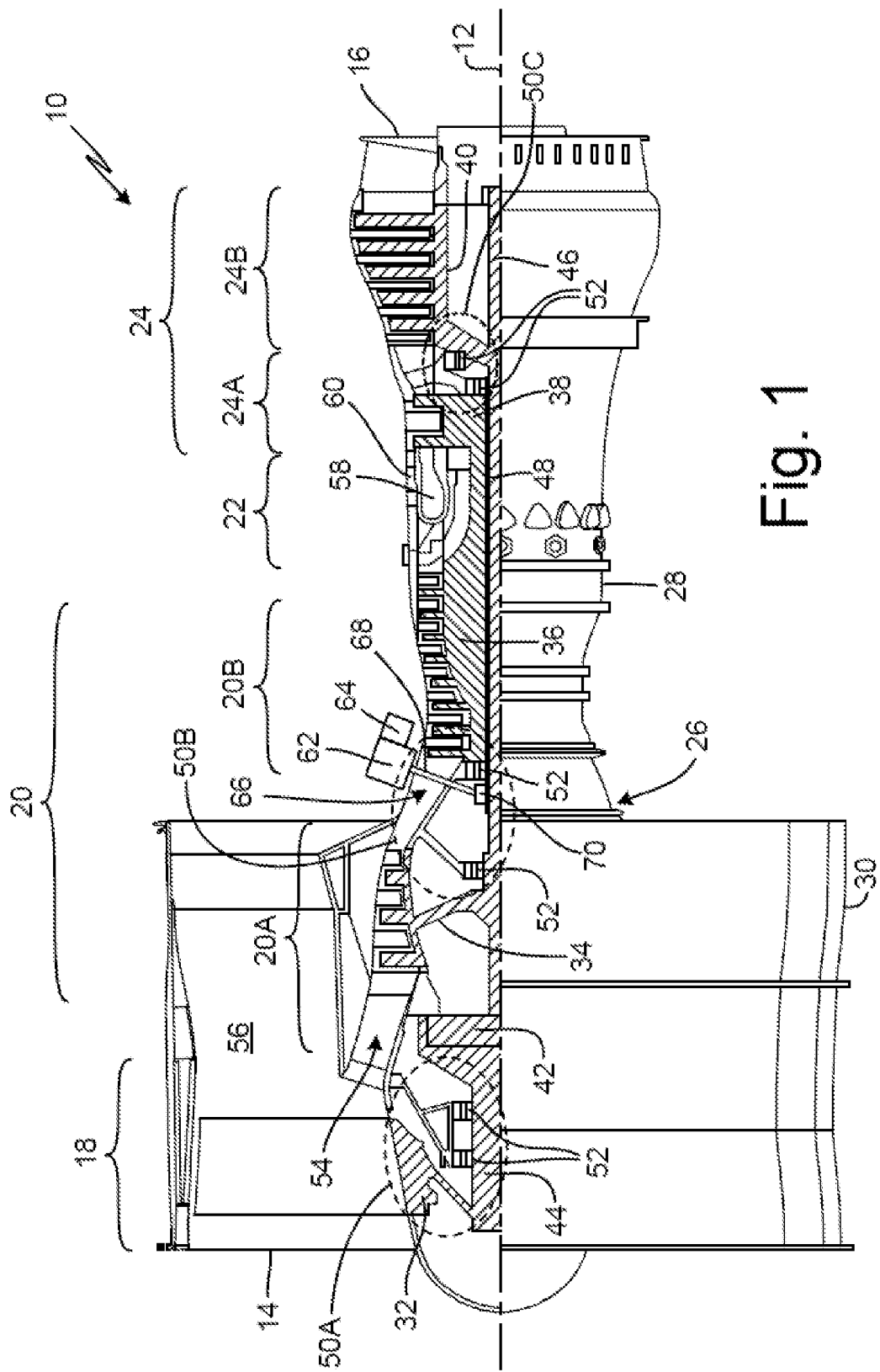
FIG. 1 is a side partial cross-section view of a turbine engine.

While the above-identified figures set forth one or more embodiments of the present disclosure, other embodiments are also contemplated, as noted in the discussion. In all cases, this disclosure presents embodiments by way of representation and not limitation. It should be understood that numerous other modifications and embodiments can be devised by those skilled in the art, which fall within the scope and spirit of the principles of the disclosure. The figures may not be drawn to scale, and applications and embodiments of the present disclosure may include features and components not specifically shown in the drawings.

DETAILED DESCRIPTION

FIG. 1 shows a side elevation cutaway view of gas turbine engine 10 and includes axial centerline 12, upstream airflow inlet 14, downstream airflow exhaust 16, fan section 18, compressor section 20 (with low pressure compressor ("LPC") section 20A and high pressure compressor ("HPC") section 20B), combustor section 22, turbine section 24 (with high pressure turbine ("HPT") section 24A and low pressure turbine ("LPT") section 24B), engine housing 26 (with inner case 28 (e.g., a core case) and outer case 30 (e.g., a fan case)), fan rotor 32, LPC rotor 34, HPC rotor 36, HPT rotor 38, LPT rotor 40, gear train 42, fan shaft 44, low speed shaft 46, high speed shaft 48, bearing compartments 50A, 50B, and 50C, plurality of bearings 52, core gas path 54, bypass gas path 56, combustion chamber 58, combustor 60, accessory gearbox 62, gearbox attachments 64, transmission system 66, tower shaft 68, and geared system 70.

Gas turbine engine 10 extends along axial centerline 12 between upstream airflow inlet 14 and downstream airflow exhaust 16. Gas turbine engine 10 includes fan section 18, compressor section 20, combustor section 22, and turbine section 24. Compressor section 20 includes LPC section 20A and HPC section 20B. Turbine section 24 includes HPT section 24A and LPT section 24B.

Fan section 18, compressor section 20, combustor section 22, and turbine section 24 are arranged sequentially along centerline 12 within engine housing 26. Engine housing 26 includes inner case 28 (e.g., a core case) and outer case 30 (e.g., a fan case). Inner case 28 may house one or more of fan section 18, compressor 20, combustor section 22, and turbine section 24 (e.g., an engine core). Outer case 30 may house at least fan section 18. Each of gas turbine engine sections 18, 20A, 20B, 24A and 24B includes respective rotors 32-40. Each of these rotors 32-40 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

Fan rotor 32 is connected to gear train 42, for example through fan shaft 44. Gear train 42 and LPC rotor 34 are connected to and driven by LPT rotor 40 through low speed shaft 46. The combination of at least LPC rotor 34, LPT rotor 40, and low speed shaft 46 may be referred to as "a low speed spool." HPC rotor 36 is connected to and driven by HPT rotor 38 through high speed shaft 48. The combination of at least HPC rotor 36, HPT rotor 38, and high speed shaft 48 may be referred to as "a high speed spool." Shafts 44-48 are rotatably supported by a plurality of bearings 52, which can be rolling element bearings, thrust bearings, or other types of bearings. Each of these bearings 52 is connected to engine housing 26 by at least one stationary structure such as, for example, an annular support strut.

During operation, air enters gas turbine engine 10 through airflow inlet 14. Air is directed through fan section 18 and is then split into either core gas path 54 or bypass gas path 56. Core gas path 54 flows sequentially through fan section 18, compressor section 20, combustor section 22, and turbine section 24. The air within core gas path 54 may be referred to as "core air." Bypass gas path 56 flows through a duct between inner case 28 and outer case 30. The air within bypass gas path 56 may be referred to as "bypass air."

The core air is compressed by LPC rotor 34 and HPC rotor 36 and directed into combustion chamber 58 of combustor 60 in combustor section 22. Fuel is injected into combustion chamber 58 and mixed with the core air that has been compressed by compressor section 20 to provide a fuel-air mixture. This fuel-air mixture is ignited and combustion products thereof expand and flow through and sequentially cause HPT rotor 38 and LPT rotor 40 to rotate. The rotations of HPT rotor 38 and LPT rotor 40 drive rotation of LPC rotor 34 and HPC rotor 36, respectively and compression of the air received from core gas path 54. The rotation of LPT rotor 40 also drives rotation of fan rotor 32, which propels bypass air through and out of bypass gas path 56. The propulsion of the bypass air may account for a majority of thrust generated by gas turbine engine 10, which can be more than 75% of engine thrust. Gas turbine engine 10 of the present disclosure, however, is not limited to the foregoing exemplary thrust ratio.

Gas turbine engine 10 of FIG. 1 also includes accessory gearbox 62, one or more gearbox attachments 64 and transmission system 66 in a mid-bearing compartment between LPC section 20A and HPC section 20B. Accessory gearbox 62 is mounted to inner case 28. However, in alternative embodiments, accessory gearbox 62 may be mounted elsewhere with gas turbine engine 10, such as to outer case 30. Accessory gearbox 62 is configured to transfer rotational energy (e.g., torque) between transmission system 66 and the one or more gearbox attachments 64. An example of an accessory gearbox is disclosed in U.S. Pat. No. 9,068,515 to Duong et al., which is assigned to the assignee of the present application. Examples of a gearbox attachment may include an air turbine starter, a de-oiler, a hydraulic pump, an oil pump, an integrated drive generator, a permanent magnet alternator and a fuel pump module. The present disclosure is not limited to including the foregoing exemplary types or configurations of accessory gearbox 62 or gearbox attachments 64.

Transmission system 66 is configured to mechanically couple and thereby transfer rotational energy (e.g., torque) between a rotating assembly (or component) of gas turbine engine 10 and accessory gearbox 62. In particular, transmission system 66 of FIG. 1 mechanically couples one of the low speed spool or high speed spool of gas turbine engine 10 to the accessory gearbox 62. Transmission system 66 includes high speed shaft 48, tower shaft 68, and geared system 70.

Figure 2:
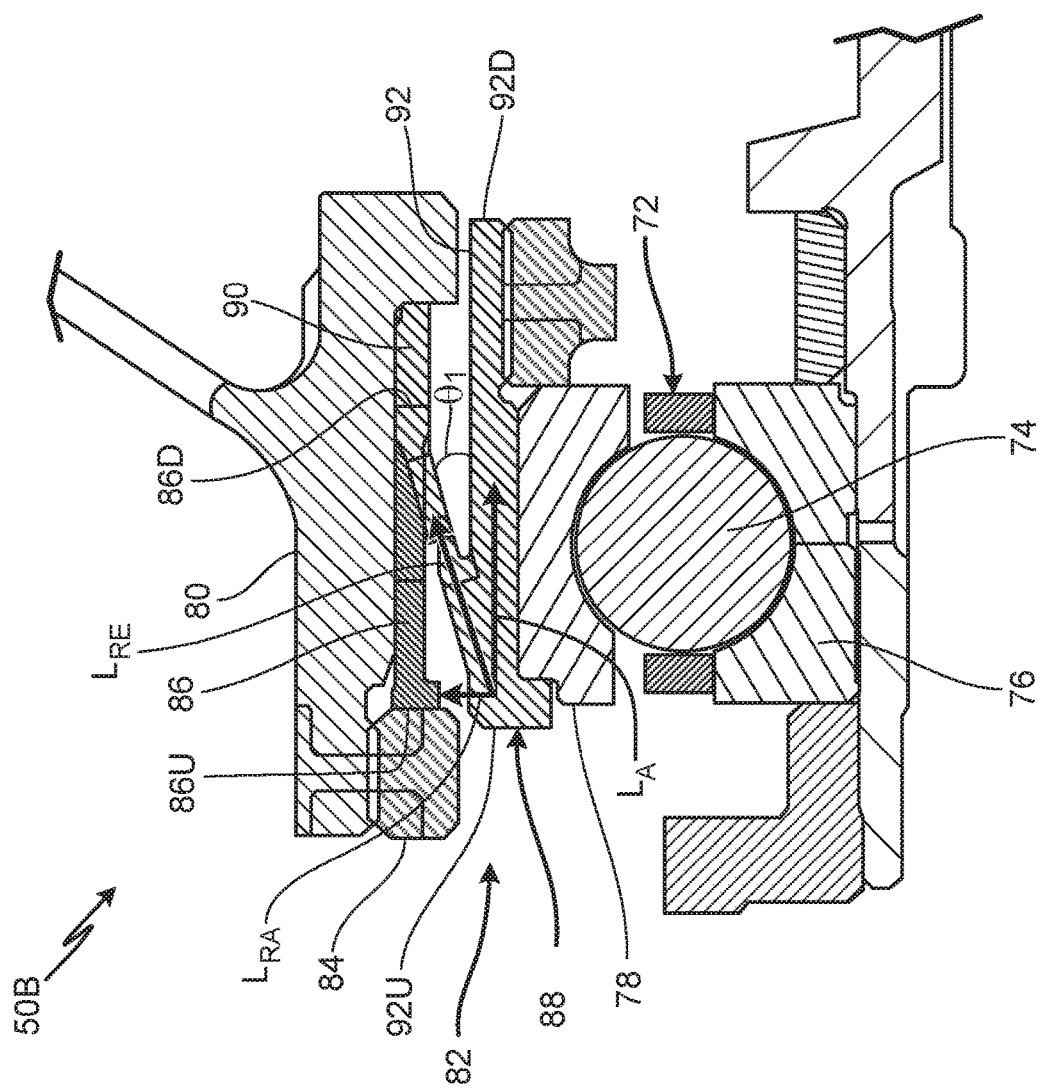
FIG. 2 is a cross-section view of a portion of a bearing compartment of the turbine engine and shows a bearing, a bearing support, and a thrust-sensing assembly.

FIG. 2 is a cross-section view of a portion of bearing compartment 50B and shows bearing 72 (with ball 74, inner race 76, and outer race 78), bearing support 80, and thrust-sensing assembly 82 (with nut 84, retaining ring 86, and spacer 88 (including outer portion 90 and inner ring 92)). FIG. 2 also shows axial load $L_A$, radial load $L_{RA}$, and resultant load $L_{RE}$.

Bearing 72 is a component enabling rotation and includes ball 74, inner race 76, and outer race 78. Ball 74 is a bearing element. In other non-limiting embodiments, ball 74 can be a non-spherical bearing such as a roller or tapered roller bearing. Inner race 76 and outer race 78 are rings or collars of solid material. Bearing support 80 is a structural frame within bearing compartment 50B. Thrust-sensing assembly 82 includes nut 84, retaining ring 86, and spacer 88. Nut 84 is a fastener with external threads to threadingly engage with bearing support 80. Retaining ring 86 is an annular ring of solid material. As will be shown and discussed with respect to FIG. 3B, retaining ring 86 includes axially extending crenels and merlons. Spacer 88 is a centering spring and includes outer portion 90 and inner portion 92. Outer portion 90 is a frusto-conical ring. Inner ring 92 is an annular ring or hollow cylinder.

First angle $\theta_1$ is an angle formed by the intersection of outer portion 90 and inner ring 92. Axial load $L_A$, radial load $L_{RA}$, and resultant load $L_{RE}$ are force vectors representative of thrust loads caused during operation of gas turbine engine 10.

Bearing 72 is disposed radially inward from and in contact with thrust-sensing assembly 82. Ball 74 is disposed radially between inner race 76 and outer race 78. Inner race 76 is disposed radially inward from ball 74. Outer race 78 is disposed radially between ball 74 and inner ring 92 of thrust-sensing assembly 82. Bearing support 80 is disposed radially outward from and in contact with outer portion 90 of thrust-sensing assembly 82. Bearing support 80 is mounted within bearing compartment 50B. Thrust-sensing assembly 82 is disposed radially between bearing support 80 and bearing 72.

Nut 84 serves to retain and secure retaining ring 86, and is positioned axially adjacent to and in contact with retaining ring 86. Nut 84 is also disposed radially inward from and in contact with a portion of bearing support 80. Retaining ring 86 is disposed axially between nut 84 and a radially outward portion of outer portion 90 of spacer 88. In this non-limiting embodiment, upstream axial end 92U of inner ring 92 of spacer 88 is positioned upstream (with an upstream direction towards the left of FIG. 2) of upstream axial end 86U of retaining ring 86. Also, downstream axial end 92D of inner ring 92 of spacer 88 is positioned downstream (with a downstream direction towards the right of FIG. 2) of downstream axial end 86D of retaining ring 86. Spacer 88 is positioned radially between bearing 72 and bearing support 80.

A radially inward and axially forward portion of outer portion 90 is connected to inner ring 92. Inner ring 92 is disposed radially outward from and in contact with outer race 78 of bearing 72. Inner ring 92 is spaced radially from retaining ring 86. In this example, inner ring 92 includes a lip located on upstream end 92U that axially abuts outer race 78 of bearing 72. First angle $\theta_1$ is formed between outer portion 90 and inner ring 92. For example, inner ring 92 extends in a generally axial direction. The frusto-conical shape of outer portion 90 causes outer portion 90 to form an acute angle with a radially outer surface of the axially extending inner ring 92. In this non-limiting embodiment, first angle $\theta_1$ can be 5° to 35°.

Bearing 72 provides for relative rotation between inner race 76 and outer race 78, as well as between components that are attached respectively thereto. During operation of gas turbine engine 10, ball 74 spins or rotates so as to allow relative rotation between inner race 76 and outer race 78. Bearing support 80 braces and holds bearing 72 and thrust-sensing assembly 82 in place relative to bearing compartment 50B. Thrust-sensing assembly 82 is installed between bearing 72 and bearing support 80 and is configured as a strain measuring assembly. In this example, thrust-sensing assembly 82 functions as a centering spring.

Nut 84 retains and presses retaining ring 86 axially against the radially outward portion of outer portion 90 of spacer 88. Nut 84 threadingly engages with a portion of bearing support 80 along a radially outer surface of nut 84. Retaining ring 86 engages with outer portion 90 of spacer 88 to press outer portion 90 against lip of bearing support 80 that extends radially inward. As will be discussed with respect to FIGS. 3A-4, spacer 88 is configured as a strain measuring device. Outer portion 90 acts as a spring element by bending along the frusto-conical portion of spacer 88 to account for axial thrust and radial loads applied to thrust-sensing assembly 82 by bearing 72 and by bearing support 80. Inner ring 92 braces spacer 88 against outer race 78 of bearing 72. Inner ring 92 also provides a structural base from which outer portion 90 connects to and extends from. Based on the size of first angle $\theta_1$, axial load $L_A$ and radial load $L_{RA}$ combine to form resultant load $L_{RE}$. During operation of gas turbine engine 10, resultant load $L_{RE}$ is passed from bearing 72 to inner ring 92 and from inner ring 92 into outer portion 90.

Due to its compact size and folded configuration, spacer 88 maintains a tight fit to both bearing 72 and bearing support 80, so that both axial and radial loads can be passed to and through thrust-sensing assembly 82. Additionally, no thinning of bearing support 80 is required in order to utilize thrust-sensing assembly 82, such as can be required in existing hard-mounted bearing assemblies.

FIG. 3A is an isolation view of spacer 88 and shows bearing 72 (with balls 74, inner race 76, and outer race 78) and spacer 88 (with outer portion 90, inner ring 92, and slots 94 (including first row 96 of slots 94, second row 98 of slots 94, and cut-outs 100)). FIG. 3B is an isolation view of thrust-sensing assembly 82 and shows bearing 72 (with balls 74, inner race 76, and outer race 78), nut 84, retaining ring 86 (with merlons 102 and crenels 104), and spacer 88 (with outer portion 90, inner ring 92, slots 94, first row 96 of slots 94, and second row 98 of slots 94). FIGS. 3A and 3B are discussed in tandem.

Slots 94 are elongated openings or slits in outer portion 90 of spacer 88. First row 96 and second row 98 are axial rows of slots 94. Cut-outs 100 are slots or indentations. Merlons 102 are axial extensions of solid material of retaining ring 86. Crenels 104 are gaps or indentations in the solid material of retaining ring 86.

Slots 94 are cut out of and extend through outer portion 90 and spacer 88. Each of slots 94 is elongated in a circumferential direction of spacer 88. First row 96 of slots 94 is disposed at a first axial position along outer portion 90 of spacer 88. Second row 98 of slots 94 is disposed at a second axial position along outer portion 90 of spacer 88 that is different than the first axial position of first row 96. First row 96 and second row 98 are circumferentially offset such that slots 94 of first row 96 are out of axial alignment (or circumferential alignment) with slots 94 in second row 98. Each of cut-outs 100 are an axially oriented cut-out that opens into one of slots 94. Each cut-out 100 is axially aligned with one slot 94 of spacer 88. Each cut-out 100 is disposed to receive one merlon 102 of retaining ring 86.

Each merlon 102 extends axially and comes into contact with outer portion 90 at one of slots 94. In this non-limiting embodiment, merlons 102 come into contact with outer portion 90 at slots 94 of second row 98. Each merlon 102 also extends through a portion of one of cut-outs 100. Each one of crenels 104 is positioned between circumferentially adjacent merlons 102.

Slots 94 provide relief cuts in outer portion 90 and spacer 88 to allow spacer 88 to absorb axial and radial thrust loads. For example, as an axial thrust load is applied to spacer 88, the load path causes tension and compression loads on the surfaces of slots 94 in outer portion 90 of spacer 88. First row 96 and second row 98 of slots 94 cause an S-shape configuration of the material of outer portion 90 that surrounds slots 94 of first row 96 and second row 98. Cut-outs 100 provide an axially oriented slot through which merlons 102 can pass through and engage with. Merlons 102 press against portions of outer portion 90 of spacer 88 to hold retaining ring 86 and spacer 88 in position relative to each other.

Instead of axially extending beams such as are on existing centering springs, spacer 88 includes S-shaped beams with which strain can be measured. For example, rather than axial beams for measuring strain by tension/compression, the beams of spacer 88 include an S-shape configuration allowing for measurement of strain due to bending, thereby increasing the sensitivity to applied loads. The S-shape configuration of spacer 88 further allows thrust-sensing assembly 82 to be space-compact.

Figure 4:
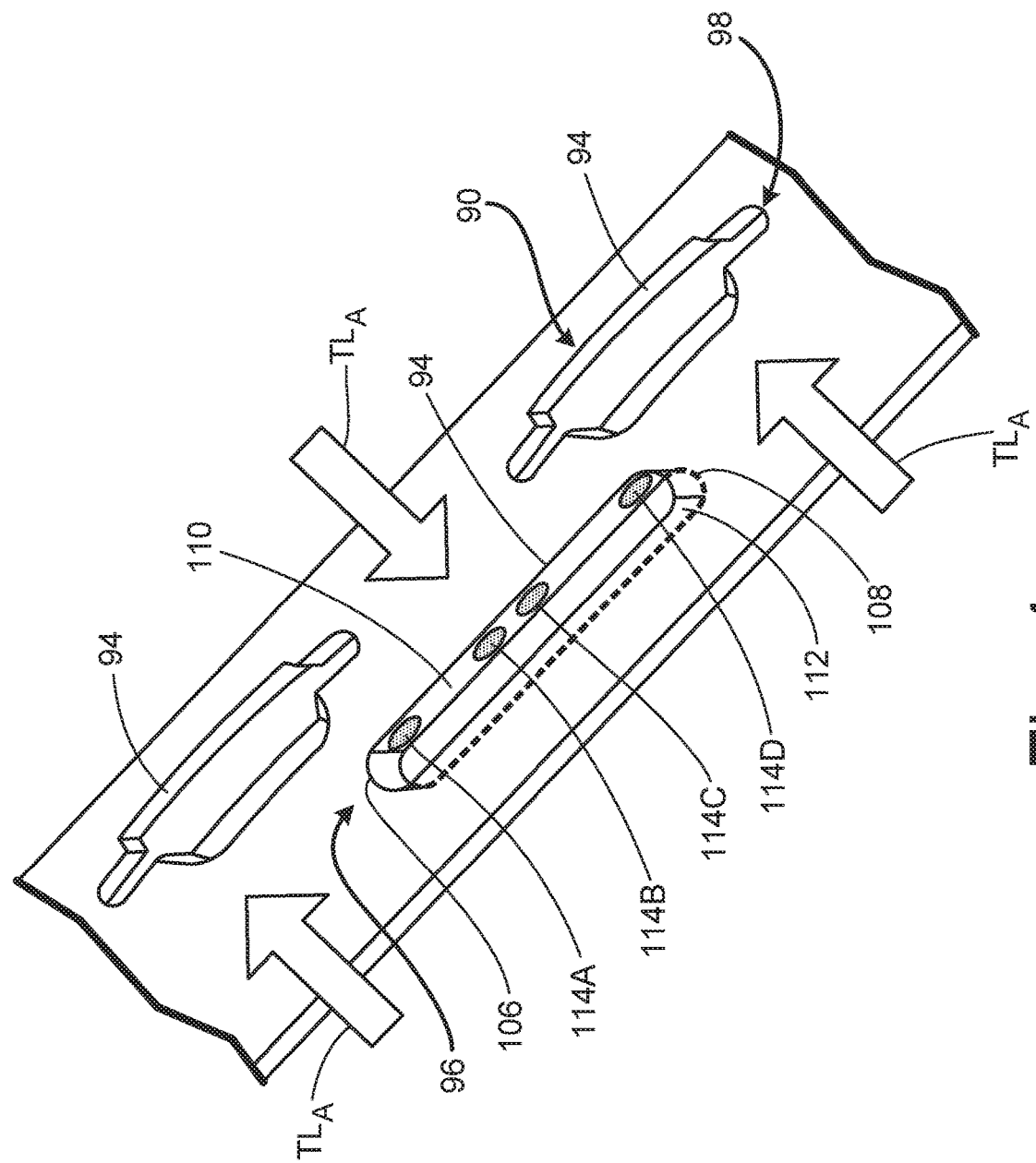
FIG. 4 is an isolated perspective view of a portion of the spacer that shows loading and strain gauges.

FIG. 4 is an isolated perspective view of a portion of outer portion 90 of spacer 88 and shows outer portion 90, slots 94 (each with first end 106, second end 108, first side-face 110, and second side-face 112), first row 96 of slots 94, second row 98 of slots 94, and strain gauges 114. FIG. 4 also shows axial thrust loads $TL_A$ applied along spacer 88.

First end 106 and second end 108 are rounded ends of one of slots 94. First side-face 110 and second side-face 112 are opposing side-faces of one of slots 94. Strain gauges 114 are devices for measuring strain. In this example, strain gauges can include foil strain gauges or semiconductor strain gauges. In this example, four strain gauges 114 are shown and are labelled as strain gauges 114A, 114B, 114C, and 114D. As used herein the term "strain gauges 114" is synonymous with the term "strain gauges 114A, 114B, 114C, and 114D". Axial thrust loads $TL_A$ are forces that are applied to outer portion 90 of spacer 88 in an axial direction.

First end 106 and second end 108 are disposed on opposite ends of one of slots 94. First side-face 110 and second side-face 112 are disposed on opposite sides of each of slots 94 and face each other. In this example, strain gauges 114 are attached to and positioned along portions of first side-face 110 of slot 94. In one non-limiting embodiment, strain gauges 114 can be adhered to a surface of first side-face 110. In another non-limiting embodiment, strain gauges 114 can be mounted to second side-face 112 and/or in slots 94 of second row 98 of slots 94. Axial thrust loads $TL_A$ are located approximately at midpoints of slots 94 as shown in FIG. 4.

Strain gauges 114 are disposed to measure an amount of tension or an amount of compression of spacer 88. For example, as axial thrust loads $TL_A$ are applied to spacer 88, the strain load path causes tension and compression loads on first and second side-faces 110 and 112 of slots 94 in spacer 88. In this example, strain gauges 114 are mounted in slots 94 in areas of peak tensions and compression which allows for measurement of those loads. In particular, strain gauges 114A and 114D are located in areas of slot 94 that experience peak compression as axial thrust loads $TL_A$ are applied to spacer 88. Meanwhile, strain gauges 114B and 114C are located in areas of slot 94 that experience peak tension as axial thrust loads $TL_A$ are applied to spacer 88.

Strain gauges 114 monitor tension and/or compression along first side-face 110 by measuring a change in electrical resistance of the strain gauge (e.g., via a Wheatstone bridge) and converting that change in electrical resistance into an amount of strain using the Gauge factor.

Thrust-sensing assembly 82 with spacer 88 allows for thrust measurement of hard-mounted bearings where such measurements typically are not possible. Thrust-sensing assembly 82 with spacer 88 further allows for thrust measurement where thrust loads are typically low enough that strain from axial tension/compression is too low to accurately measure. Thrust-sensing assembly 82 with spacer 88 also enables the ability to measure strain without compromising radial load-supporting capabilities in hard-mounted bearings. Moreover, thrust-sensing assembly 82 with spacer 88 reduces the axial length requirements for thrust measuring hardware within the bearing compartments of gas turbine engine 10.

Discussion of Possible Embodiments

A thrust-sensing assembly for a bearing compartment of a gas turbine engine includes a spacer and a retaining ring. The spacer includes an outer frusto-conical portion and an inner ring. The outer frusto-conical portion includes an axial row of a plurality of slots. Each slot of the plurality of slots includes a first rounded end, a second rounded end, a first side-face, and a second side face that faces the first side-face. The retaining ring includes a plurality of axial extensions with distal ends that are in contact with the outer frusto-conical portion of the spacer.

The assembly of the preceding paragraph can optionally include, additionally and/or alternatively, any one or more of the following features, configurations and/or additional components.

A nut can be disposed to press the retaining ring in an axial direction against a portion of the spacer.

Each slot of the plurality of slots can be elongated in a circumferential direction of the spacer.

A strain gauge can be mounted to one of the first and/or second side faces of one of the slots of the plurality of slots.

The strain gauge can be disposed to measure an amount of tension or an amount of compression of the spacer.

The spacer can include an axially oriented cut-out that can open into one of the plurality of slots, wherein the cut-out can be axially aligned with a slot of the plurality of slots of the spacer, wherein the cut-out can be disposed to receive an axial extension of the retaining ring.

An S-shaped beam can be disposed between adjacent slots of the spacer.

The frusto-conical portion and/or the inner ring can connect to form a first angle, wherein the first angle can be acute.

The first angle can be 5° to 35°.

An assembly for a bearing compartment of a gas turbine engine includes a bearing support, a thrust-sensing assembly, and a bearing assembly. The bearing support is connected to a frame of the gas turbine engine. The thrust-sensing assembly held in position by the bearing support and includes a spacer and a retaining ring. The spacer includes an outer frusto-conical portion with an axial row of a plurality of slots and an inner ring connected to the outer frusto-conical portion. The retaining ring includes a plurality of axial extensions that are in contact with the outer frusto-conical portion of the spacer. The bearing assembly is disposed radially inward and in contact with the thrust sensing assembly.

The assembly of the preceding paragraph can optionally include, additionally and/or alternatively, any one or more of the following features, configurations and/or additional components.

An outer race, an inner race can be disposed radially inward from the outer race, and/or a plurality of bearing elements can be disposed between the outer race and the inner race, wherein the inner ring of the spacer can be in contact with the outer race of the bearing assembly.

Each slot of the plurality of slots can include a first rounded end, a second rounded end, a first side-face, and/or a second side face, wherein the first and second side faces can face each other.

A strain gauge can be mounted to one of the first and/or second side faces of one of the slots of the plurality of slots.

The strain gauge can be disposed to measure an amount of tension or an amount of compression of the spacer.

Each slot of the plurality of slots can be elongated in a circumferential direction of the spacer.

A nut can be disposed to press the retaining ring in an axial direction against a portion of the spacer.

The spacer can include an axially oriented cut-out that can open into one of the plurality of slots, wherein the cut-out can be axially aligned with a slot of the plurality of slots of the spacer, wherein the cut-out can be disposed to receive an axial extension of the retaining ring.

An S-shaped beam can be disposed between adjacent slots of the spacer.

The frusto-conical portion and/or the inner ring can connect to form a first angle, wherein the first angle can be acute.

The first angle can be 5° to 35°.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A thrust-sensing assembly for a bearing compartment of a gas turbine engine, the thrust-sensing assembly comprising:
 a spacer comprising:
  an outer frusto-conical portion with an axial row of a plurality of slots, wherein each slot of the plurality of slots includes a first rounded end, a second rounded end, a first side-face, and a second side face, wherein the first and second side faces face each other; and
  an inner ring connected to the outer frusto-conical portion at a first axial end of the outer frusto-conical portion;
 a strain gauge mounted to one of the slots of the plurality of slots; and
 a retaining ring with a plurality of axial extensions, wherein the distal ends of the axial extensions are in contact with the outer frusto-conical portion of the spacer.

2. The thrust-sensing assembly of claim 1, and further comprising a nut disposed to press the retaining ring in an axial direction against a portion of the spacer.

3. The thrust-sensing assembly of claim 1, wherein each slot of the plurality of slots is elongated in a circumferential direction of the spacer.

4. The thrust-sensing assembly of claim 1, wherein the strain gauge is mounted to one of the first and second side faces of one of the slots of the plurality of slots.

5. The thrust-sensing assembly of claim 1, wherein the strain gauge is disposed to measure an amount of tension or an amount of compression of the spacer.

6. The thrust-sensing assembly of claim 1, wherein the spacer includes an axially B oriented cut-out that opens into one of the plurality of slots, wherein the cut-out is disposed to receive an axial extension of the retaining ring.

7. The thrust-sensing assembly of claim 1, wherein the plurality of slots comprises a first row and a second row, wherein the first row and the second row are circumferentially offset such that slots from the first row are out of axial alignment with slots from the second row.

8. The thrust-sensing assembly of claim 1, wherein the frusto-conical portion and the inner ring connect to form a first angle, wherein the first angle is acute.

9. The thrust-sensing assembly of claim 8, wherein the first angle is 5° to 35°.

10. An assembly for a bearing compartment of a gas turbine engine, the assembly comprising:
- a bearing support connected to a frame of the gas turbine engine;
- a thrust-sensing assembly held in position by the bearing support, wherein the thrust-sensing assembly comprises:
  - a spacer comprising:
    - an outer frusto-conical portion with an axial row of a plurality of slots;
    - a strain gauge mounted to one of the plurality of slots; and
    - an inner ring connected to the outer frusto-conical portion; and
  - a retaining ring with a plurality of axial extensions that are in contact with the outer frusto-conical portion of the spacer; and
- a bearing assembly disposed radially inward and in contact with the thrust sensing assembly.

11. The assembly of claim 10, wherein the bearing assembly comprises:
- an outer race;
- an inner race disposed radially inward from the outer race; and
- a plurality of bearing elements disposed between the outer race and the inner race, wherein the inner ring of the spacer is in contact with the outer race of the bearing assembly.

12. The assembly of claim 10, wherein each slot of the plurality of slots includes a first rounded end, a second rounded end, a first side-face, and a second side face, wherein the first and second side faces face each other.

13. The assembly of claim 12, wherein the strain gauge is mounted to one of the first and second side faces of one of the slots of the plurality of slots.

14. The assembly of claim 13, wherein the strain gauge is disposed to measure an amount of tension or an amount of compression of the spacer.

15. The assembly of claim 10, wherein each slot of the plurality of slots is elongated in a circumferential direction of the spacer.

16. The assembly of claim 10, and further comprising a nut disposed to press the retaining ring in an axial direction against a portion of the spacer.

17. The assembly of claim 10, wherein the spacer includes an axially oriented cut-out that B opens into one of the plurality of slots, wherein the cut-out is disposed to receive an axial extension of the retaining ring.

18. The assembly of claim 10, wherein the plurality of slots comprises a first row and a second row, wherein the first row and the second row are circumferentially offset such that slots from the first row are out of axial alignment with slots from the second row.

19. The assembly of claim 10, wherein the frusto-conical portion and the inner ring connect to form a first angle, wherein the first angle is acute.

20. The assembly of claim 10, wherein the first angle is 5° to 35°.

* * * * *